UNITED STATES PATENT OFFICE.

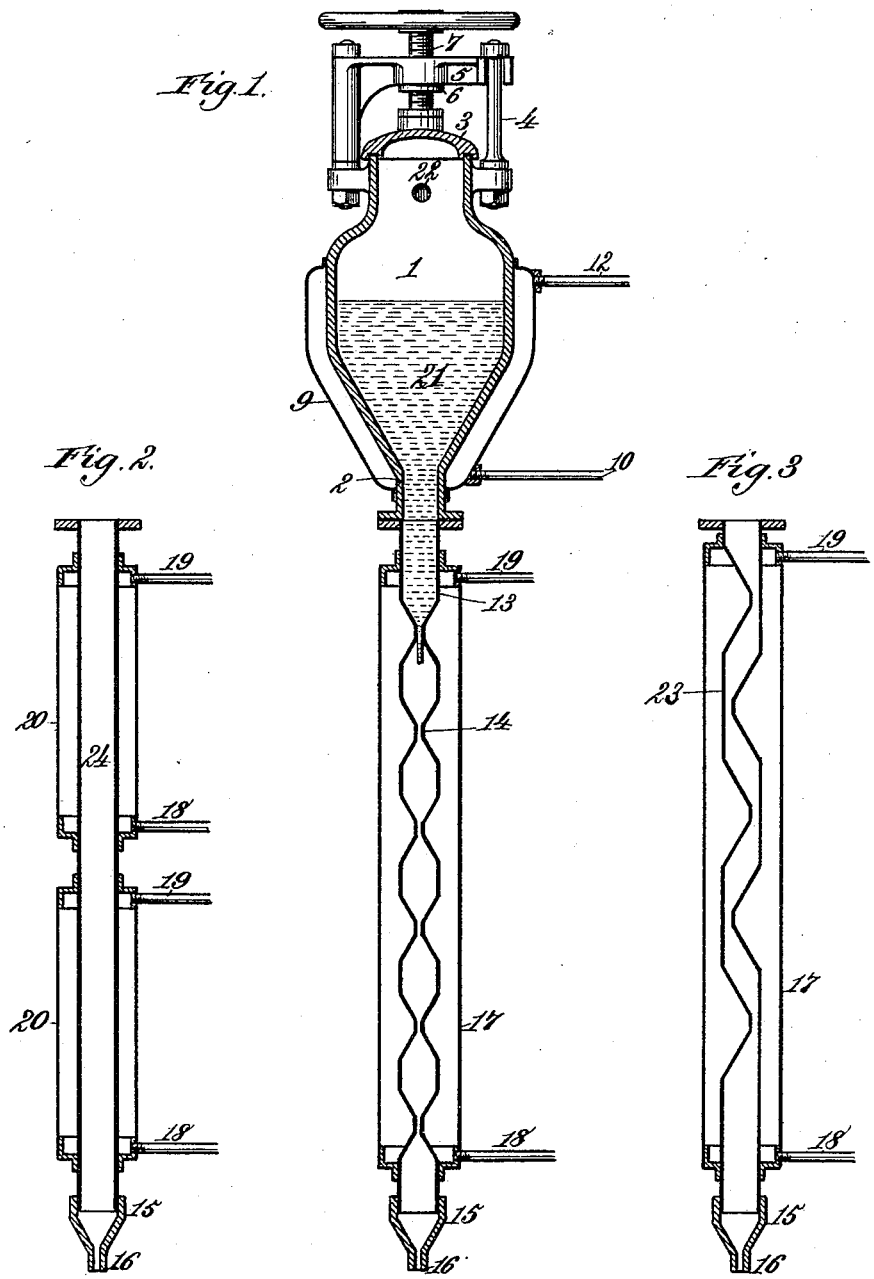

BURCHARD THOENS, OF NEW ORLEANS, LOUISIANA.

CANDY-MACHINE.

SPECIFICATION forming part of Letters Patent No. 480,149, dated August 2, 1892.

Application filed November 25, 1891. Serial No. 413,091. (No model.)

*To all whom it may concern:*

Be it known that I, BURCHARD THOENS, a subject of the Emperor of Germany, residing at New Orleans, in the parish of Orleans and State of Louisiana, have invented certain new and useful Improvements in Candy-Machines; and I do hereby declare that the following is a full, clear, and exact description of the same, reference being had to the annexed drawings, making a part of this specification, and to the figures of reference marked thereon.

My invention relates to the manufacture of candy, and the purpose thereof is to provide novel means for treating or manipulating the prepared candy material in bulk mechanically, whereby it shall be intimately mixed and brought to any desired form or the product caused to be striped and shaped, curled, twisted, flattened, or otherwise varied, the rapidity and economy of production and the uniformity of the product being much superior to that accomplished by hand manipulation.

It is my purpose, also, to provide novel means whereby the candy material shall be subjected to successively-different temperatures in order to cool the same gradually and uniformly or in any particular manner required by special material or compositions thereof.

My invention consists to these ends in the novel combinations of mechanical parts, all as hereinafter set forth, and then more particularly pointed out and defined in the claims which conclude this specification.

To enable those skilled in the art to understand and practice my invention, I will proceed to describe the same in detail, reference being made to the accompanying drawings, in which—

Figure 1 is a central vertical section of an apparatus built in conformity with my invention. Fig. 2 is a similar section showing a modified construction of the lower part of said apparatus. Fig. 3 is a similar longitudinal section showing a further modification in construction.

In the said drawings, the reference-numeral 1 indicates a vessel or container of any suitable size or form, its lower portion being preferably so constructed that the contents will be conducted to a neck 2, which forms the exit. The cover 3 of said vessel is in the form shown capable of closing hermetically, or substantially so, and for this purpose brackets are thrown out from opposite sides of the mouth or upper end, to which are connected uprights 4, having a bridge-piece 5 at their upper ends. The center of this bridge-piece is provided with a rigid nut 6 for a screw 7, upon the lower end of which is swiveled the cover 3.

The body of the vessel 1 is inclosed by a jacket 9, having an inlet and outlet 10 and 12, respectively. To the neck 2 is attached a pipe or conveyer 13 of any suitable shape, its interior forming a continuous passage with the discharge-opening of the neck. This pipe 13, which is of any suitable length, is provided at intervals with contracted or strangulated portions 14, and the lower extremity of said pipe is provided with a nozzle or tip 15, having a contracted orifice 16, which may be varied in both size and form to suit it to the work to be performed. The pipe 13 is inclosed by a jacket 17, having an inlet and exit pipe 18 and 19, respectively. This jacket may, however, be in more than one section, as shown in Fig. 2, where a pipe of somewhat different form is shown inclosed by a plurality of jackets 20, each having its own inlet and outlet.

The candy material, which is indicated in Fig. 1 by the numeral 21, is prepared in any known or preferred manner, and being partially cooled to a point where it is still plastic it is introduced into the vessel 1 and the cover 3 is then closed. Air is then forced into said vessel through an inlet-opening 22 until the interior pressure is sufficient to drive the plastic candy composition through the neck 2 and into and through the pipe 13. Here it is forced successively through the contracted or strangulated portions 14, from each of which it issues in an attenuated filament or thin strip into the larger pipe-section below, where it is cooled and curled up into every possible form. As the larger section of pipe is filled, the pressure from above forces the plastic candy material through the second contraction 14 into the second larger pipe-section, where the same operation is repeated. This operation is continued until the plastic mass, now thoroughly kneaded, intimately mingled, and of uniform plasticity and composition, reaches the tip 15. From the contracted orifice 16 of this tip it issues in a continuous strip or filament or of such other form as may be desired. For example, by rifling the exit-orifice the strip, stick, or filament will be twisted, and this twist may be of varied pitch to suit the taste of the manufacturers and purchasers. By extending one lip of the orifice a little beyond the other and by slightly curving its face the issuing strip may be caused to coil, and by adjusting the direction of the lip the coil may be caused to assume a spiral or a helical form of any pitch.

A piston working in the vessel 1 and operated by steam, compressed air, or by a screw is the complete equivalent of the air-pressure, and I contemplate using either, as circumstances may decide.

The candy emerging from the exit of the nozzle is received and cooled in any preferred manner, and may be cut up into any suitable lengths by any means adapted to the purpose, either mechanical or manual.

The jackets inclosing the vessel 1 and pipe or conveyer 13 are used to receive steam, hot water, or heated air, the temperature being usually somewhat lower than that of the candy material. This matter, however, is subject to variations, according to the nature of the material treated and the process to which it is subjected.

Where two or more independent jackets are used upon the pipe 13, I may, in some cases, use different temperatures in the different jackets, thereby subjecting the candy material successively to a plurality of temperatures each differing from the others. Thus, for example, I may in some cases gradually cool the candy composition as it approaches the exit end of the pipe or as it traverses the conveyer 13; but I may also use the same or different temperatures in any known or preferred manner.

Instead of the form of pipe or conveyer in Fig. 1, I may use the strangulated conveyer 23 shown in Fig. 3, or I may omit the strangulations 14 and use a straight conveyer 24, as shown in Fig. 2. The latter is employed for flint candy, which requires no pulling or mixing.

By having two or more conveyers or pipes, each with candy material of a different color, uniting in such manner as to discharge their contents through one nozzle, the issuing strip, stick, or filament will be striped.

What I claim is—

1. A candy-making machine consisting of a vessel or container having a discharge-neck and a closing-cover and a pipe connected with the discharge-neck and provided at intervals with a series of contractions, substantially as described.

2. A candy-making machine consisting of a vessel or container having a discharge-neck and a closing-cover, a pipe connected with the discharge-neck and provided at intervals with a series of contractions, and a nozzle secured to the lower end of the pipe and provided with a contracted orifice, substantially as described.

3. A candy-making machine consisting of a vessel or container having a discharge-neck and a closing-cover, a jacket surrounding the vessel or container and having inlet and outlet pipes, a conveying-pipe connected with the discharge-neck of the vessel or container and having at its lower end a nozzle provided with a contracted orifice, and a jacket surrounding the conveying-pipe and having an inlet and an outlet, substantially as described.

4. A candy-making machine consisting of a vessel or container provided with an air-inlet opening 22, a discharge-neck 2, and a closing-cover 3, a jacket 9, surrounding the vessel or container and having an inlet and an outlet, a conveying-pipe connected with the discharge-neck and having at its lower end a nozzle provided with a contracted orifice, and a jacket surrounding the conveying-pipe and provided with an inlet and an outlet, substantially as described.

5. An apparatus for manipulating candy material, consisting of a suitable closed vessel, means for subjecting the contents thereof to pressure, a pipe or conveyer into which the contents of said vessel are discharged under pressure, said pipe or conveyer having at suitable intervals contracted or strangulated portions forming part of the continuous passage and being provided with a tip having a contracted exit-opening, and one or more jackets inclosing said pipe or conveyer and having suitable inlet and outlet, substantially as described.

In testimony whereof I have hereunto subscribed my name in the presence of two witnesses.

BURCHARD THOENS.

Witnesses:
 WALTER H. COOK,
 I. R. RICHARDSON.